(12) United States Patent
Veach (10) Patent No.: US 6,864,787 B1
(45) Date of Patent: Mar. 8, 2005

(54) FRONT SAFETY BRAKE LIGHTS

(76) Inventor: Sherri Coseo Veach, 2513 Riverside Dr., Port Huron, MI (US) 48060

( * ) Notice: Subject to any disclaimer, the term of this patent is extended or adjusted under 35 U.S.C. 154(b) by 149 days.

(21) Appl. No.: 10/004,933

(22) Filed: Dec. 5, 2001

(51) Int. Cl.[7] ................................................. B60Q 1/44
(52) U.S. Cl. ...................................... 340/479; 340/468
(58) Field of Search ................................ 340/479, 467, 340/463, 464, 468, 471; 362/494, 496, 505, 506

(56) References Cited

U.S. PATENT DOCUMENTS

| | | | |
|---|---|---|---|
| 3,665,392 A | 5/1972 | Annas | |
| 4,532,578 A | 7/1985 | Gaden et al. | |
| 4,940,962 A | 7/1990 | Sarokin | 340/466 |
| 5,188,445 A | 2/1993 | Haun et al. | 340/474 |
| 5,255,165 A | 10/1993 | Cail | 362/80.1 |
| 5,258,740 A | * 11/1993 | Viano et al. | 340/467 |
| 5,373,426 A | 12/1994 | O'Sullivan | 362/83.3 |
| 5,537,091 A | 7/1996 | Hull et al. | 340/479 |
| 5,680,101 A | 10/1997 | Pitcher | 340/479 |
| 5,758,944 A | 6/1998 | Jandron | 340/479 |
| 5,788,358 A | 8/1998 | Davis | 340/479 |
| 5,798,691 A | 8/1998 | Tim Kao | 340/479 |
| 5,895,115 A | * 4/1999 | Parker et al. | 362/511 |
| 5,966,073 A | * 10/1999 | Walton | 340/479 |

FOREIGN PATENT DOCUMENTS

DE    4239753    6/1994

* cited by examiner

Primary Examiner—Brent A. Swarthout
(74) Attorney, Agent, or Firm—Michael I. Kroll (57) ABSTRACT

A supplemental brake light assembly for viewing from the front of the vehicle includes embodiments where the indicator is visible for one hundred eighty degrees (180°) and may be afforded by the implementation of one or more sources. The primary light can be integrated within the bumper or retrofitted, and in one embodiment is elongated to go along the bumper and around the edges to be visible from both the front and sides of the vehicle. In another embodiment three brake lights are front-mounted to present an inverted triangle for so distinguishing from the conventional triangle appearance of the rear brake lights. The upper lights are positioned adjacent the headlight assemblies or the turn signals to form the top of the triangle, and are wrapped about the corners of the vehicle to obtain one hundred eighty degrees (180°) of visibility. The primary light is attached to the front bumper to form the apex of the inverted triangle. In one embodiment optical fibers are used to present a forward facing display.

1 Claim, 13 Drawing Sheets

FRONT SAFETY BRAKE LIGHTS

BACKGROUND OF THE INVENTION

1. Field of the Invention

The present invention relates generally to vehicle brake light systems and, more specifically, to front safety brake lights for the vehicle.

2. Description of the Prior Art

There are other safety light device designed for motor vehicles. Typical of these is U.S. Pat. No. 3,665,392 issued to Annas on May 23, 1972.

Another patent was issued to Gaden et al. on Jul. 30, 1985 as U.S. Pat. No. 4,532,578. Yet another U.S. Pat. No. 4,940,962 was issued to Sarokin on Jul. 10, 1990 and still yet another was issued on Feb. 23, 1993 to Haun et al. as U.S. Pat. No. 5,188,445.

Another patent was issued to Cail on Oct. 19, 1993 as U.S. Pat. No. 5,255,165. Yet another U.S. Pat. No. 5,373,426 was issued to O'Sullivan on Dec. 13, 1994. Another was issued to Hull et al. on Jul. 16, 1996 as U.S. Pat. No. 5,537,091 and still yet another was issued on Oct. 21, 1997 to Pitcher as U.S. Pat. No. 5,680,101.

Another patent was issued to Jandron on Jun. 2, 1998 as U.S. Pat. No. 5,758,944. Yet another U.S. Pat. No. 5,788,358 was issued to Davis on Aug. 4, 1998. Another was issued to Tim Kao on Aug. 25, 1998 as U.S. Pat. No. 5,798,691 and still yet another was issued on Jun. 9, 1994 to Kees as DE Pat. No. 4,239,753.

U.S. Pat. No. 3,665,392

Inventor: John T. Annas

Issued: May 23, 1972

A driver communication signal mounted against the front windshield of a motor vehicle, visible to pedestrials and on-corning traffic and automatically energized upon brake application to indicate driver's intention to stop. The invention provides a double light source and driver observed light source monitoring means as well as provision to ensure good visibility even on bright sunshine days.

U.S. Pat. No. 4,532,578

Inventor: David W. Gaden et al.

Issued: Jul. 30, 1985

A vehicle body lamp mounting arrangement wherein a vehicle body lamp assembly includes linear retention flanges on its upper and lower walls which engage behind and in face to face relationship with linear retention flanges of a body lamp opening to releasably retain the lamp assembly within the opening against movement outboard thereof.

U.S. Pat. No. 4,940,962

Inventor: Jerry L. Sarokin

Issued: Jul. 10, 1990

A braking indicator for vehicles provides an indication from the front of the vehicle that the vehicle brakes are being applied. The indicator includes a plurality of lights, preferably two, which are mounted and viewable from the front of the vehicle. The first sensor is connected to the brake pedal to detect the initial depression of the brake pedal. A second sensor is connected to the brake system of the vehicle to sense further depression of the brake pedal. The first and second sensors are connected to certain of the front mounted indicator lights to energize certain of the front mounted indicator lights upon the initial depression of brake pedal and further depression of the brake pedal. Alternately, a sensor is connected to the speedometer of the vehicle to detect the speed of the vehicle. The speed sensor provides an output when the vehicle reaches a pre-determined speed, preferably a slow speed. The second sensor and the speed sensor cooperate to energize certain of the indicator lights during continued depression of the brake pedal when the vehicle reaches the pre-set slow speed.

U.S. Pat. No. 5,188,445

Inventor: Harold Haun et al.

Issued: Feb. 23, 1993

An emergency response vehicle such as an ambulance is provided with a warning unit that provides a visual and audible warning signal. The warning unit is mounted in a recess or cutout in the hood which covers the engine compartment of the vehicle. This positioning of the warning unit avoids blockage of the air flow through the radiator required for cooling of the vehicle engine. Brackets or other suitable devices are used to mount the warning unit, preferably to a wall such as a radiator support, so that the warning unit remains stationary during opening and closing of the hood. The wall also serves to block rearward passage of the noise generated by the warning unit.

U.S. Pat. No. 5,255,165

Inventor: John M. Cail

Issued: Oct. 19, 1993

A brake light assembly in the form of a rectangularly shaped housing is adapted to be mounted on the inside surface of the front windshield of an automobile or similar vehicle. The assembly includes a reflective lens facing forward, a series of lamps configured in a column and mounted within the housing behind the lens, a power cord for attachment to the vehicle's conventional brake light circuit, and a pair of suction cups for affixing the assembly to the inside surface of the vehicle windshield. In an alternative arrangement, a flexible rim is provided on the anterior of the housing for blocking light leaks which might interfere with the driver's normal vision, and which furthermore, includes an activatable adhesive for affixing the housing rim to the inside surface of the windshield.

U.S. Pat. No. 5,373,426

Inventor: Alan L. O'Sullivan

Issued: Dec. 13, 1994

A vehicle brake light signal for alerting pedestrians or other vehicle drivers positioned in front of a vehicle to a deceleration of the associated vehicle. The device includes signal assembly which may be secured to a front area of the vehicle. The signal assembly is electrically coupled to both the brake lights of the vehicle and a variable rate flasher. Upon a depression of the brake pedal of the vehicle, the signal assembly will illuminate or flash to warn others of the vehicle's deceleration. Alternate embodiments of the present invention further include a variable aperture assembly controlled by a deceleration sensor for varying the intensity of the signal assembly as a function of the vehicle's deceleration, and a lens cover positionable over the signal assembly operable to produce three distinct light zones.

U.S. Pat. No. 5,537,091

Inventor: Harold L. Hull et al.

Issued: Jul. 16, 1996

A method of using the existing wiring circuits of a vehicle to provide a front braking indicator signal without adding any components other than two "jumper" cables between properly identified circuits to cause the front turn signals to act in unison with the back turn signals when the braking circuit is energized.

U.S. Pat. No. 5,680,101

Inventor: Laurence S. Pitcher

Issued: Oct. 21, 1997

A light of standard color is illuminated when the braking means of a vehicle is applied. The light is extinguished when the braking means are released. The light is located on the forepart of a vehicle preferably in the mid-line, facing in a forward direction the light beam emanating therefrom projecting towards the front of a vehicle, and is so placed at or above dash-board level so as to be clearly visible to other vehicles or persons facing said vehicle or through the rear view mirror if such an equipped vehicle is approaching from behind. The forward facing brake light is one in number to avoid confusion with standard double or multiple rear brake lights and is visible both day and night when brakes are activated.

U.S. Pat. No. 5,758,944

Inventor: Gary David Jandron

Issued: Jun. 2, 1998

Vehicle side/front brake lights comprising a brake indicator bulb located in a recessed formed in a side of a vehicle at a front extent thereof. The brake indicator bulb is actuated upon braking of the vehicle. Also, a cover with a red hue is coupled over the recess allowing the brake indicator light to disperse a red light from the side of the vehicle upon braking thereby warning pedestrians, bicycles, and other vehicles to a side/front thereof.

U.S. Pat. No. 5,788,358

Inventor: Richard E. Davis

Issued: Aug. 4, 1998

A brake light for an automobile having a windshield, a rear view mirror and a brake light circuit. The light is supported on the mirror by a support and keeper pivoted to the support for gripping the mirror holder. Second, third and fourth embodiment each having a support means and a keeper having a projection on the support means and spaced legs on the keeper that are received on each side of the projection. A second embodiment has external teeth on the projection that receive internal teeth on the keeper for holding the keeper in clamped relation with the projection to clamp a support member between them. A third embodiment has a projection and spaced legs on the support spaced outwardly from the projection. The legs on the keeper are received between the legs of the support means and the projection. The legs on the support have internal teeth that engage external teeth on the legs of the keeper and resilient means on the keeper legs hold the teeth on the keeper in engagement with the teeth on the projection.

U.S. Pat. No. 5,798,691

Inventor: Nien Tsu Tim Kao

Issued: Aug. 25, 1998

An accessory brake light system for automobile includes an elongated housing having a receiving cavity therein and a front transparent shield covering the receiving cavity, a lighting apparatus having a plurality of brake lighting LEDs mounted within the receiving cavity of the elongated housing, an electrical controlling device for connecting the lighting apparatus with the power source of the automobile and activating the lighting apparatus to provide lighting when the automobile is braked, and a mounting means for firmly securing the elongated housing to a frontmost central position of the automobile, such as a central position on the front bumper, the front license case, or a radiation cover positioning between the two front head lamps of the automobile. Whereby the automobile can provide specific warning signals when the automobile is braking to slow down or fully stopped, in order to enable the other vehicles or pedestrians that are positioned in front of the vehicle to clearly aware that whether the driver of that vehicle is preparing to stop or not and hence reduce the chance of accident from happening.

DE Pat. No. 4,239,753

Inventor: Wolf-Hennig Kees

Issued: Jun. 9, 1994

The mounting comprises a spring clip securing the trafficator light in a seating provided by the vehicle shock absorber immediately adjacent the vehicle headlamp, so that the setting mechanism for the latter is concealed when the trafficator light is fitted in place. The spring clip defines a pre-assembly position for the trafficator light, in which the headlamp setting mechanism is accessible. Preferably the spring clip is L-shaped with one arm attached to the housing of the trafficator light the other having two ratchet recesses cooperating with the nose of the headlamp housing.

While these lighting fixtures may be suitable for the purposes for which they were designed, they do not provide a specially configured supplemental brake light system that provides brake lights viewable from the front and sides of a vehicle, nor a supplemental brake light system that has three lights that present an inverted triangle appearance when viewed from the front of the vehicle, and they would not be as suitable for the purposes of the present invention, as hereinafter described.

SUMMARY OF THE PRESENT INVENTION

A primary object of the present invention is to provide an illumination device for the front of a motor vehicle indicating the application of the vehicle's brakes.

Still yet another object of the present invention is to provide a supplemental brake light assembly mounted to the front of a motor vehicle having a fiber optic connection with the motor vehicle's brake light.

Yet another object of the present invention is to provide a supplemental brake light assembly mounted to the front of a motor vehicle having an electrical connection with the motor vehicle's brake light circuitry.

Another object of the present invention is to provide a supplemental brake light assembly that is housed within the front bumper of a motor vehicle.

Another object of the present invention is to provide a supplemental brake light assembly having a hermetically sealed enclosure housing.

Additional objects of the present invention will appear as the description proceeds.

The present invention overcomes the shortcomings of the prior art by providing a front safety brake lights for a motor vehicle. The front safety brake lights are positioned in the front of the motor vehicle whereby when the operator of said vehicle applies the brakes at least one lighting fixture will illuminate. Thereby giving visual indication that the brakes of said vehicle have been applied.

The front brake safety lights are incorporated into the structure of the motor vehicle and would be visible through at least a 180 degree arc substantially parallel with the front of the vehicle.

Furthermore, the invention provides for an additional element in the form of a lighting fixture that can be retrofitted to existing motor vehicles by mounting the device onto the front of said existing motor vehicle and splicing the electrical leads into the existing motor vehicle's brake light circuitry.

In combination with a brake lighting system for a vehicle, the vehicle having a front and rear structure, a brake and an electric brake light system having at least one brake light positioned on the vehicle rear structure and electrical wiring, the rear brake light system being electrically wired to respond to the application of the brake by causing the at least one brake light to shine, there is provided a supplemental electric brake light, comprising: an electric light source; an enclosure for enclosing the light source, the enclosure being positioned on the vehicle front structure, the enclosure being elongated such that the electric light source is visible from the front and both sides of the vehicle; and supplemental electrical wiring for including the supplemental brake light in the vehicle electric brake light system such that the supplemental electric brake light light source shines in response to application of the vehicle brake.

In another embodiment, the electric light source includes a plurality of electric lights within the enclosure.

In another embodiment, the vehicle has a front bumper and the enclosure is positioned on the vehicle bumper.

In another embodiment, the vehicle has two turn signals positioned on the vehicle front structure and two of the at least one enclosures are positioned proximate said turn signals.

In another embodiment, the vehicle has two headlight assemblies positioned on the vehicle front structure and two of the at least one enclosures are positioned proximate said headlight assemblies, at least one of the two enclosures being proximate each of said headlight assemblies.

In another embodiment, the vehicle has a front bumper and the enclosure is integrated within said front bumper.

In another embodiment, the vehicle has a front bumper, the front bumper has an exterior, and the enclosure is attached to the front bumper exterior.

In another embodiment, the enclosure is attached by bolts, the front bumper having holes to fastenably receive the bolts.

In another embodiment, the enclosure is attached by a plurality of hooked fasteners, such that the fasteners hook the front bumper.

In combination with a brake lighting system for a vehicle, the vehicle having a front and rear structure, a brake and an electric brake light system having at, least one brake light positioned on the vehicle rear structure and electrical wiring, the rear brake light system being electrically wired to respond to the application of the brake by causing the at least one brake light to shine, there is provided a supplemental electric brake light assembly, comprising: a first, second and third electric light source; a first enclosure for enclosing the first light source, a second enclosure for enclosing the second light source, and a third enclosure for enclosing the third light source, the first, second and third enclosures being positioned on the vehicle front structure and arranged to form a triangle when viewed from the front of the vehicle; and supplemental electrical wiring for including the supplemental brake light assembly in the vehicle electric brake light system such that the first, second and third supplemental electric brake light light sources shine in response to application of the vehicle brake.

In another embodiment, the vehicle has a front bumper and the third enclosure is positioned on the vehicle bumper.

In another embodiment, the vehicle has two headlight assemblies each assembly having an inner edge, and the positioned enclosure has a left end and right end, the third enclosure being positioned such that the left end and right end are between vertical lines extending downwardly from the headlight assemblies inner edges.

In another embodiment, the vehicle has two headlight assemblies each assembly having an inner edge, and the positioned enclosure has a left end and right end, the third enclosure being positioned such that the left end and right end terminate on the vertical lines extending downwardly from the headlight assemblies inner edges.

In another embodiment, the vehicle has two headlight assemblies each assembly having an inner edge, and the positioned enclosure has a left end and right end, the third enclosure being positioned such that the left end and right end are outside vertical lines extending downwardly from the headlight assemblies inner edges.

In another embodiment, the vehicle has two turn signals positioned on the vehicle front structure and the first and second enclosures are positioned proximate said turn signals.

In another embodiment, the vehicle has two headlight assemblies positioned on the vehicle front structure and the first and second enclosures are positioned proximate said headlight assemblies.

In another embodiment, two of the light sources are also the vehicle turn signals.

In another embodiment, the vehicle has a front bumper and the third enclosure is integrated within said front bumper.

In another embodiment, the vehicle has a front bumper, the front bumper having an exterior, and the third enclosure is attached to the front bumper exterior.

In another embodiment, the third enclosure is attached by bolts, the front bumper having holes to fastenably receive the bolts.

In another embodiment, the third enclosure is attached by a plurality of hooked fasteners, such that the fasteners hook the front bumper.

In combination with a brake lighting system for a vehicle, the vehicle having a front and rear structure, a brake and an electric brake light system having at least one brake light positioned on the vehicle rear structure and electrical wiring, the rear brake light system being electrically wired to respond to the application of the brake by causing the at least one brake light to shine, there is provided a supplemental electric brake light assembly, comprising up to but not limited: a first, second and/or third electric light source; a first enclosure for enclosing the first light source, a second enclosure for enclosing the second light source, and a third enclosure for enclosing the third light source, the first and second enclosures being positioned on the vehicle front structure proximate the turn signals, such that the first electric light source is visible from the front and side of the vehicle, and such that the second electric light source is visible from the front and the other side of the vehicle, the third enclosure being positioned on the vehicle front structure and being elongated such that the third electric light source is visible from the front and both sides of the vehicle; and supplemental electrical wiring for including the supplemental brake light assembly in the vehicle electric brake light system such that the first, second and third supplemental electric brake light light sources shine in response to application of the vehicle brake.

In another embodiment, the third electric light source includes a plurality of electric lights within the third enclosure.

In another embodiment, the vehicle has a front bumper and the third enclosure is positioned on the vehicle bumper.

In another embodiment, the vehicle has a front bumper and the third enclosure is integrated within said front bumper.

In another embodiment, the vehicle has a front bumper, the front bumper having an exterior, and the third enclosure is attached to the front bumper exterior or interior to produce a/an flush appearance.

In another embodiment, the third enclosure is attached by bolts, the front bumper having holes to fastenably receive the bolts.

In another embodiment, the third enclosure is attached by a plurality of hooked fasteners, such that the fasteners hook the front bumper.

In combination with a brake lighting system for a vehicle, the vehicle having a front and rear structure, a brake and an electric brake light system having at least one brake light positioned on the vehicle rear structure and electrical wiring, the rear brake light system being electrically wired to respond to the application of the brake by causing the at least one brake light to shine, there is provided a supplemental electric brake light assembly, comprising: a first, second and/or third electric light source; a first enclosure for enclosing the first light source, a second enclosure for enclosing the second light source, and a third enclosure for enclosing the third light source, the first and second enclosures being positioned on the vehicle front structure, such that the first electric light source is visible from the front and side of the vehicle, and such that the second electric light source is visible from the front and the other side of the vehicle, the third enclosure being positioned on the vehicle front structure and being elongated such that the third electric light source is visible from the front and both sides of the vehicle; supplemental electrical wiring for including the supplemental brake light assembly in the vehicle electric brake light system such that the first, second and third supplemental electric brake light light sources shine in response to application of the vehicle brake; and the first and second light sources also function as the vehicle front turn signals.

In combination with a lighting system for a vehicle, the vehicle having a front and rear structure, a brake and an electric brake light system having at least one brake light positioned on the vehicle rear structure and electrical wiring, the rear brake light system being electrically wired to respond to the application of the brake by causing the at least one brake light to shine, there is provided a supplemental electric brake light, comprising: an electric light source; means for enclosing and positioning the light source on the front bumper, such that the electric light source is visible from the front and both sides of the vehicle; and supplemental electrical wiring for including the supplemental brake light in the vehicle electric brake light system such that the supplemental electric brake light light source shines in response to application of the vehicle brake.

In combination with a lighting system for a vehicle, the vehicle having a front and rear structure, a brake and an electric brake light system having at least one brake light positioned on the vehicle rear structure and electrical wiring, the rear brake light system being electrically wired to respond to the application of the brake by causing the at least one brake light to shine, there is provided a supplemental electric brake light assembly, comprising: a first, second and third electric light source; means for enclosing the first, second and third light sources and positioning said light sources on the vehicle front structure such that the positioned light sources form a triangle when viewed from the front of the vehicle; and supplemental electrical wiring for including the supplemental brake light assembly in the vehicle electric brake light system such that the first, second and third supplemental electric brake light light sources shine in response to application of the vehicle brake.

In combination with a lighting system for a vehicle, the vehicle having a front and rear structure, a brake and an electric brake light system having at least one brake light positioned on the vehicle rear structure and electrical wiring, the rear brake light system being electrically wired to respond to the application of the brake by causing the at least one brake light to shine, there is provided a supplemental electric brake light assembly, comprising: a first, second and third electric light source; means for enclosing and positioning said light sources on the vehicle front structure such that all three are viewable from the front of the vehicle and at least two are viewable from each side of the vehicle; and supplemental electrical wiring for including the supplemental brake light assembly in the vehicle electric brake light system such that the first, second and third supplemental electric brake light light sources shine in response to application of the vehicle brake.

In combination with a brake lighting system for a vehicle, the vehicle having a front and rear structure, a brake and an electric brake light system having at least one brake light positioned on the vehicle rear structure and electrical wiring, the rear brake light system being electrically wired to respond to the application of the brake by causing the at least one brake light to shine, there is provided a supplemental electric brake light, comprising: an electric light source; an enclosure for enclosing the light source, the enclosure being positioned on the vehicle front structure; supplemental electrical wiring for including the supplemental brake light in the vehicle electric brake light system such that the supplemental electric brake light light source shines in response to application of the vehicle brake; and a plurality of optical fibers positioned within the enclosure to route light from the light source to a position such that light emitted from the plurality of optical fibers is visible from the front of the vehicle.

In another embodiment, the supplemental electric brake light further comprises a display member mounted within the enclosure, the display having a plurality of holes and a diffusing lens, the optical fibers being routed to the holes and the emitted light being visible through the diffusing lens.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the figures illustrate the Front Safety Brake Lights of the present invention. With regard to the reference numerals used, the following numbering is used throughout the various drawing figures.

20 Front Safety Brake Lights
22 vehicle
23 vehicle front structure
24 vehicle first side
25 vehicle second side
26 vehicle front bumper
27 vehicle headlight
28 vehicle turn signal
30 primary light
32 primary light enclosure
34 primary light bulbs
36 primary light bulb socket
38 primary light wiring
40 primary light mounting holes
42 clips
44 clip screws
48 bumper hole
50 upper light
100 alternate embodiment
102 alternate embodiment enclosure
104 alternate embodiment slots
106 alternate embodiment fasteners
108 fastener hook
110 fastener bolt portion
112 fastener spring
200 alternate embodiment
202 alternate embodiment enclosure
204 alternate embodiment bolt
206 alternate embodiment nut
208 alternate embodiment washer
300 alternate embodiment
302 light source
304 optical fibers
306 display
308 display bracket
310 display bracket fasteners
312 display diffuser lens

DETAILED DESCRIPTION OF THE PREFERRED EMBODIMENTS

The following discussion describes in detail the preferred embodiments of the invention. This discussion should not be construed, however, as limiting the invention to those particular embodiments. Practitioners skilled in the art will recognize numerous other embodiments as well. For a definition of the complete scope of the invention, the reader is directed to the appended claims.

FIGS. 1–13 depict various embodiments of the Front Safety Brake Lights of the present invention. In the preferred embodiment, a supplemental brake light assembly 20 is attached to a vehicle 22, the vehicle having a front 23, a first side 24, a second side 25, a front bumper 26, a pair of headlights 27 and turn signals 28, as shown in FIGS. 1–2 and FIGS. 3–5.

Figure 1:
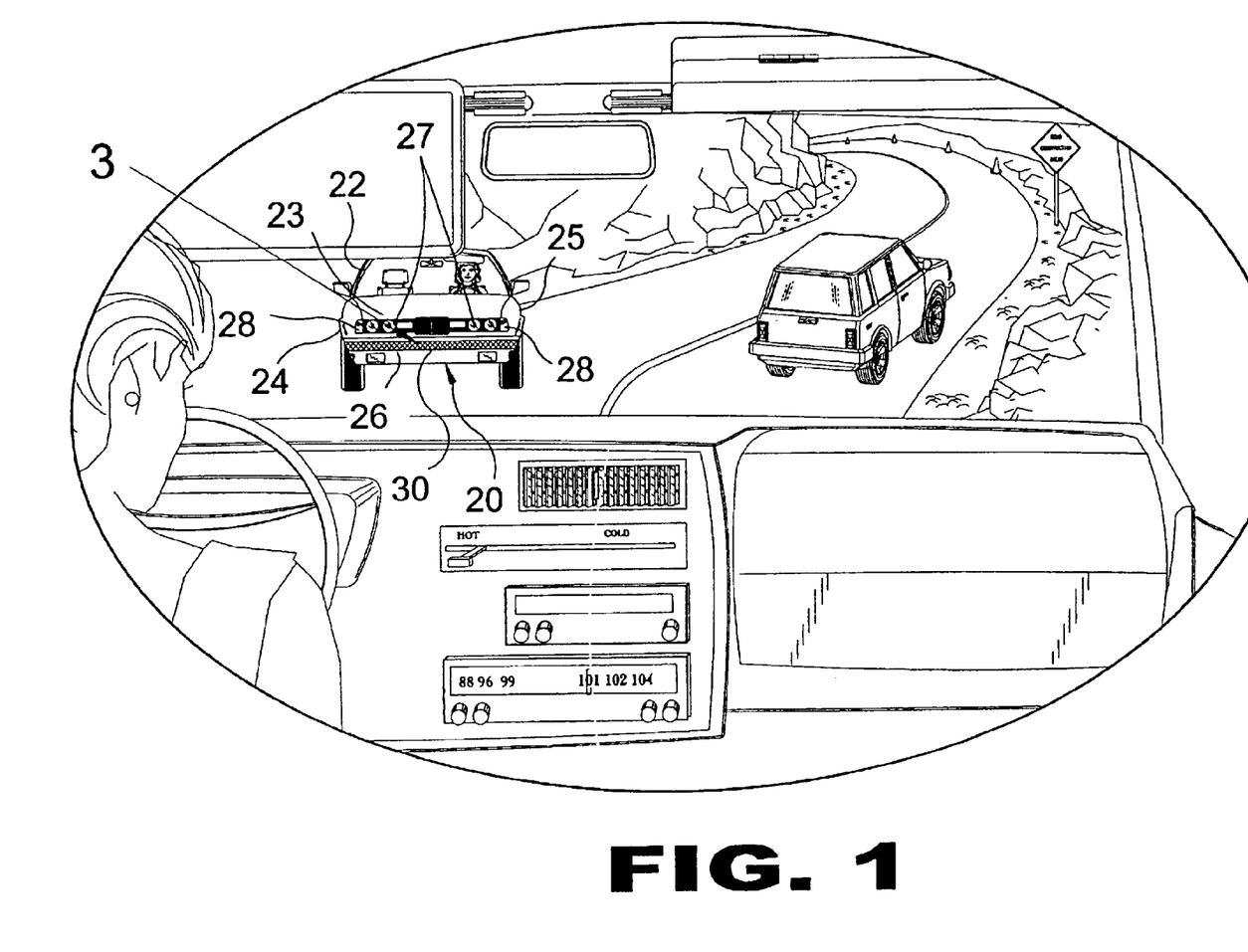
FIG. 1 is an illustrative view of the primary brake light of present invention in use. The front brake light device of the present invention provides an indication from the front of the vehicle that the vehicle brakes are being applied. The front brake light indicator includes one or more lights within an enclosure, mounted to be viewable from the front of the vehicle.
Figure 2:
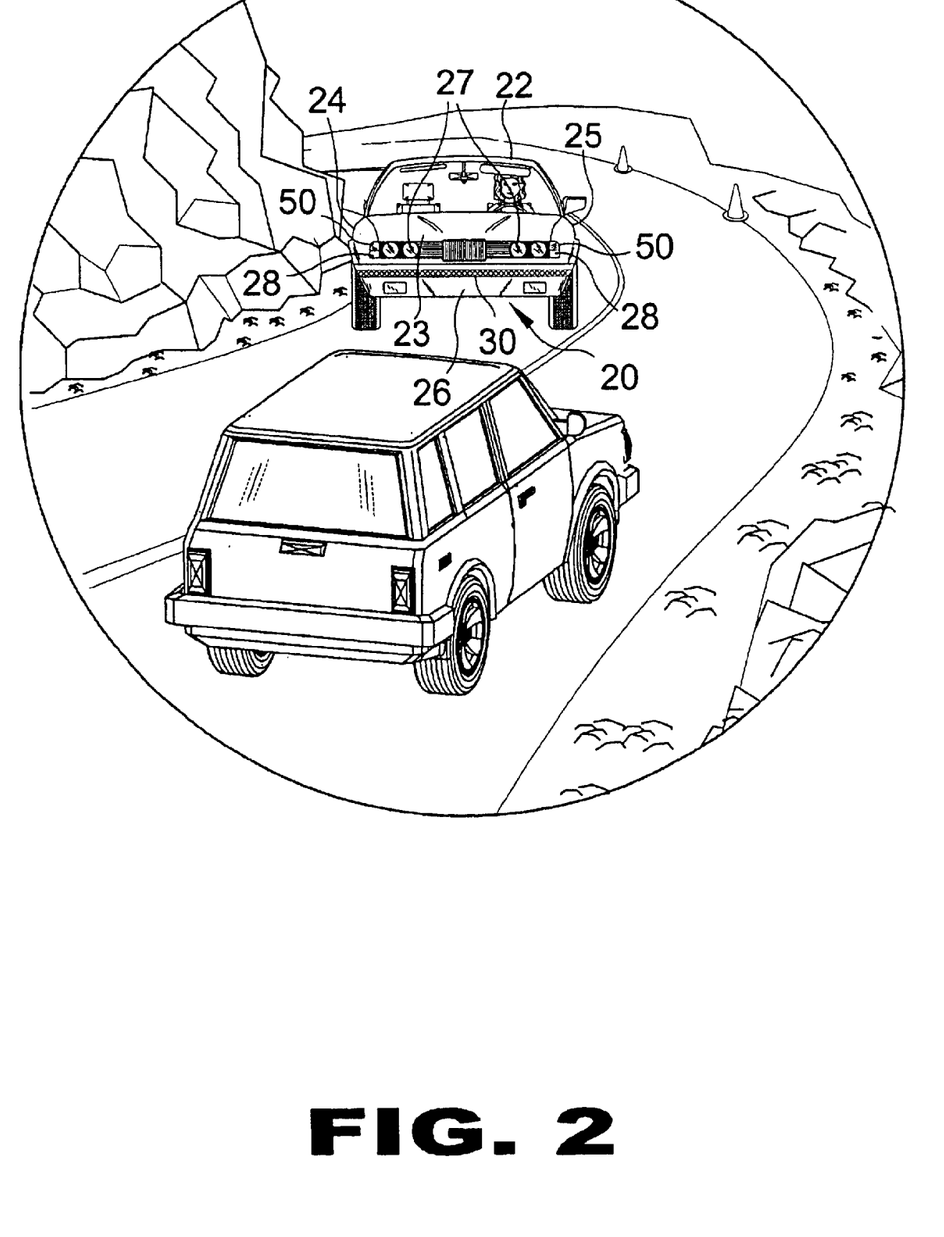
FIG. 2 is an illustrative view of the present invention in use. The front vehicle brake light system is connected to the vehicle brake light electrical wiring, to detect the depression of the brake pedal. The brake light signal can alert pedestrians or other vehicle drivers positioned in front of a vehicle to a deceleration of the associated vehicle.
Figure 3:
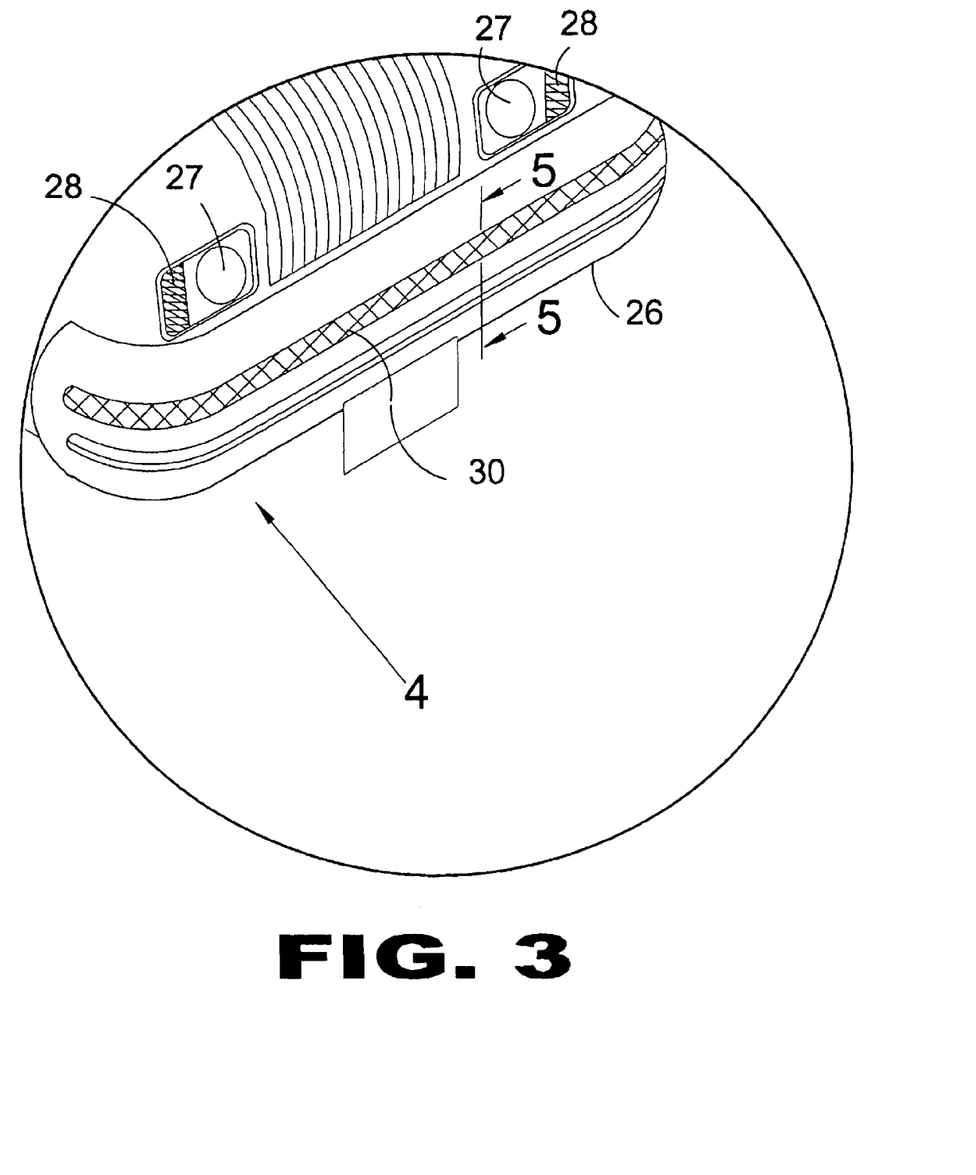
FIG. 3 is an illustrative view of the primary brake light of the present invention. The brake light system of the present invention is mounted within a vehicle's bumper, providing an indication from the front and side of the vehicle that the brake lights are being applied.
Figure 4:
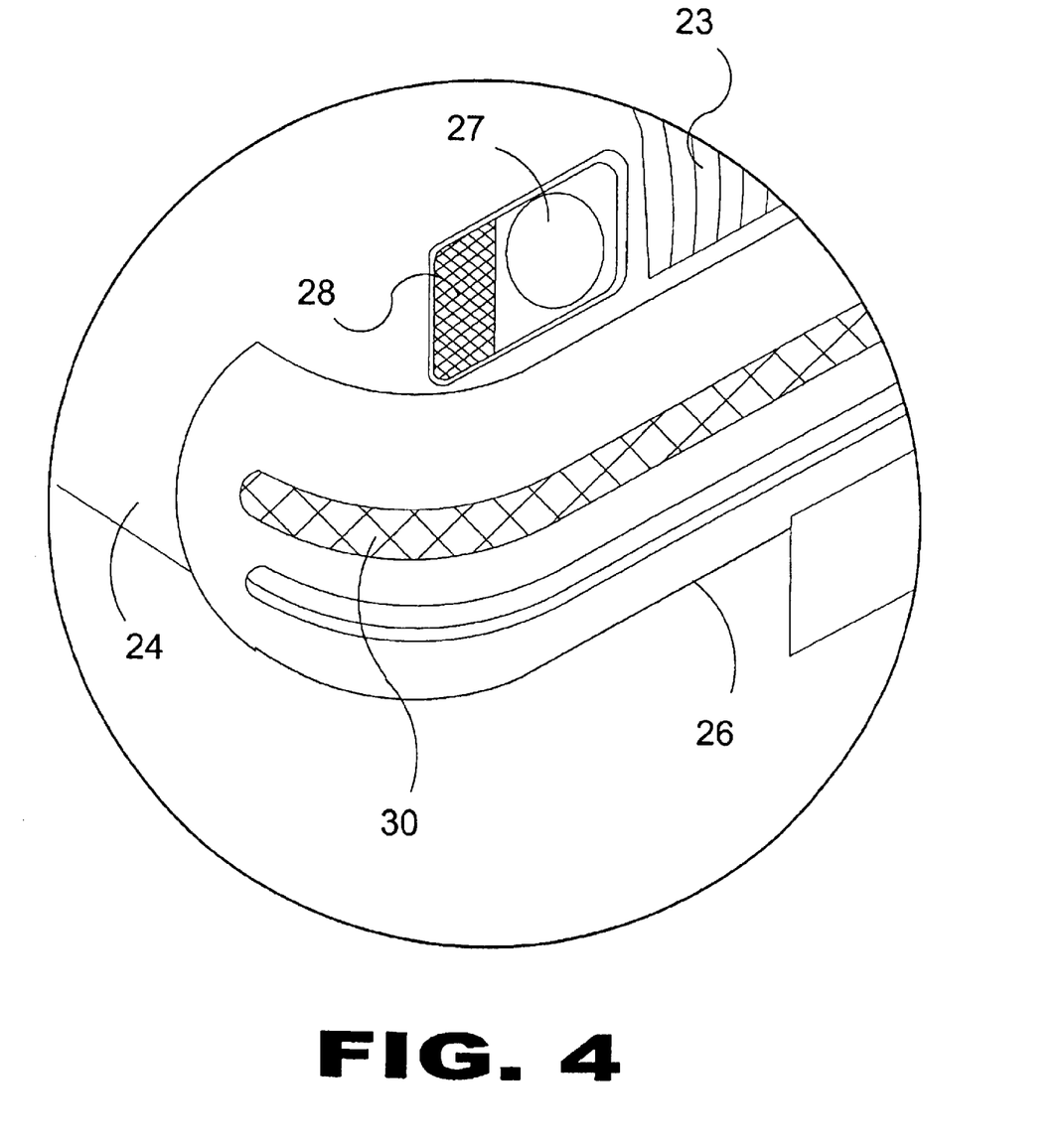
FIG. 4 is a detail view of the primary brake light of the present invention in use. A brake light is mounted within the bumper of a vehicle spanning one distal end of the bumper to the other and provides minimum glare to approaching vehicles and pedestrians.
Figure 5:
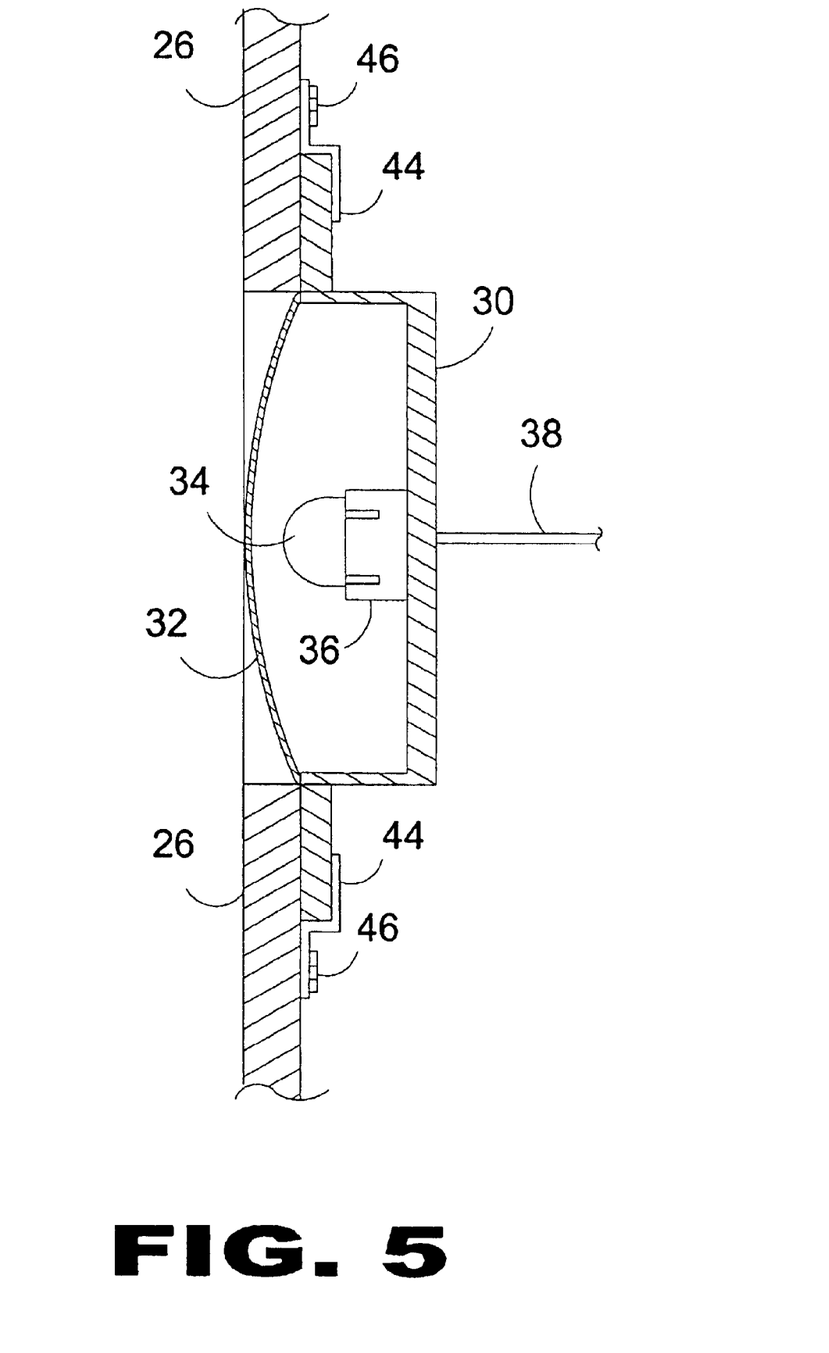
FIG. 5 is a sectional side view of the primary brake light of the present invention.
Figure 6:
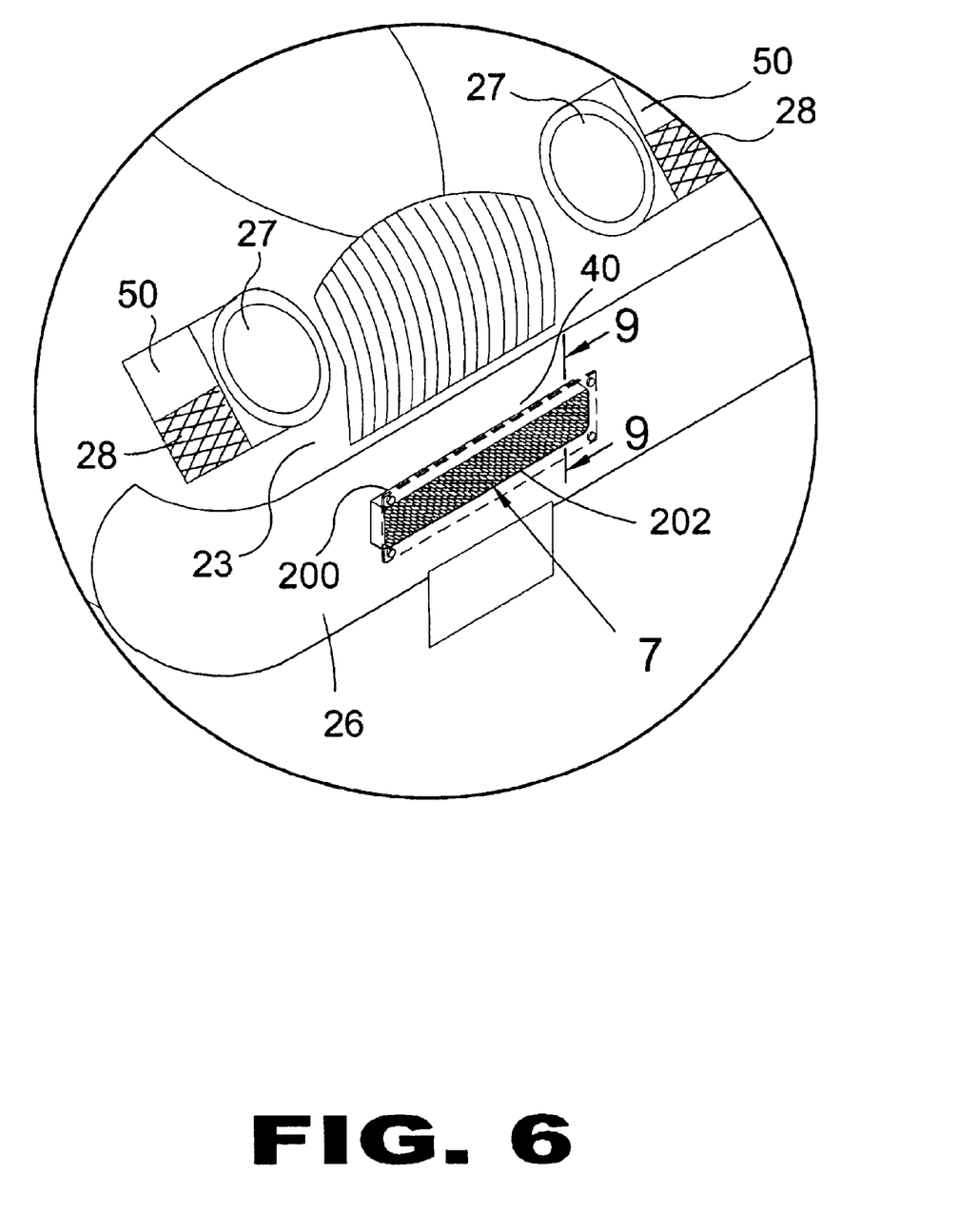
FIG. 6 is an illustrative view of an alternate embodiment brake light of the present invention.
Figure 7:
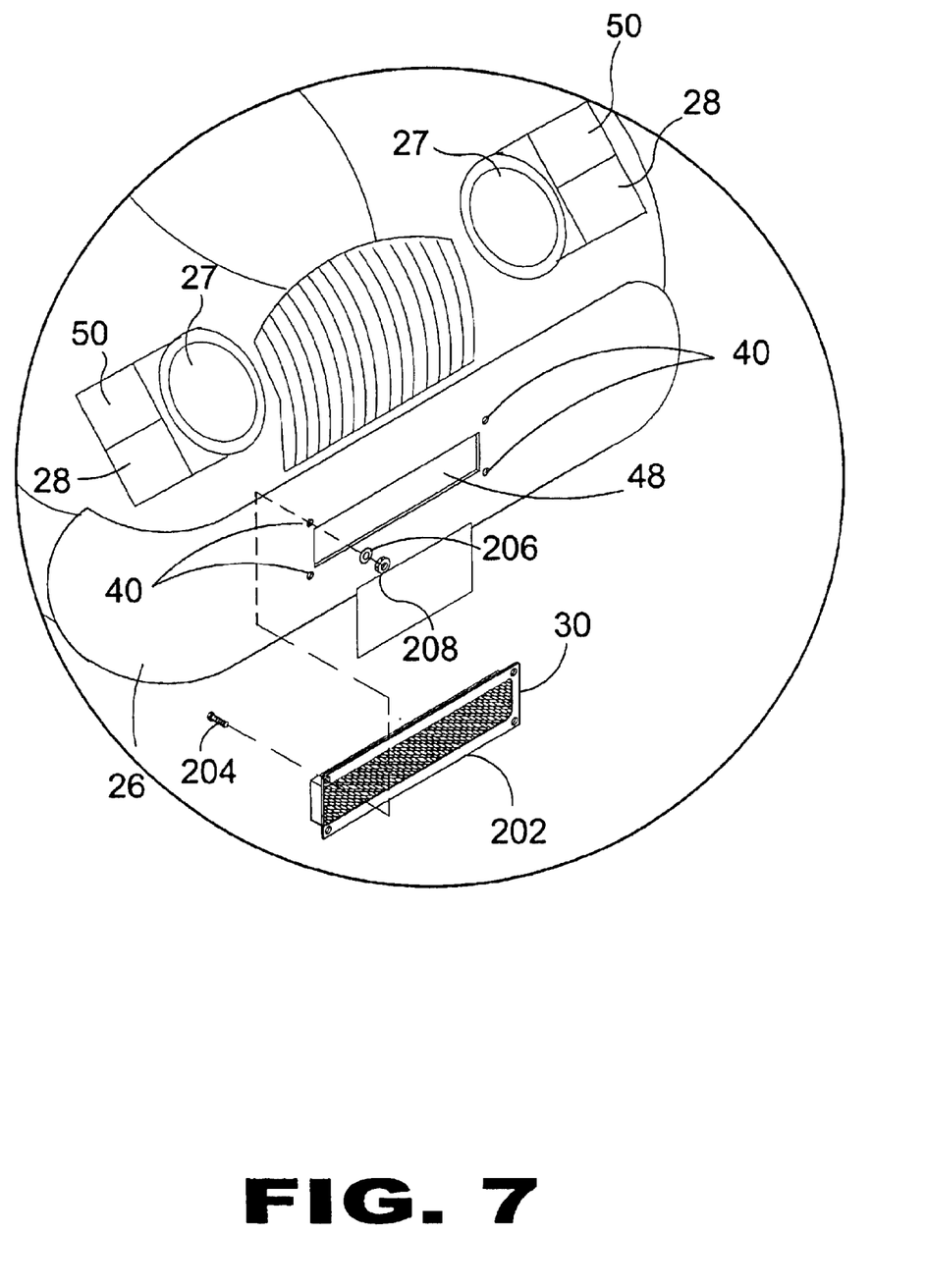
FIG. 7 is a partially exploded view of the alternate embodiment of the present invention.
Figure 8:
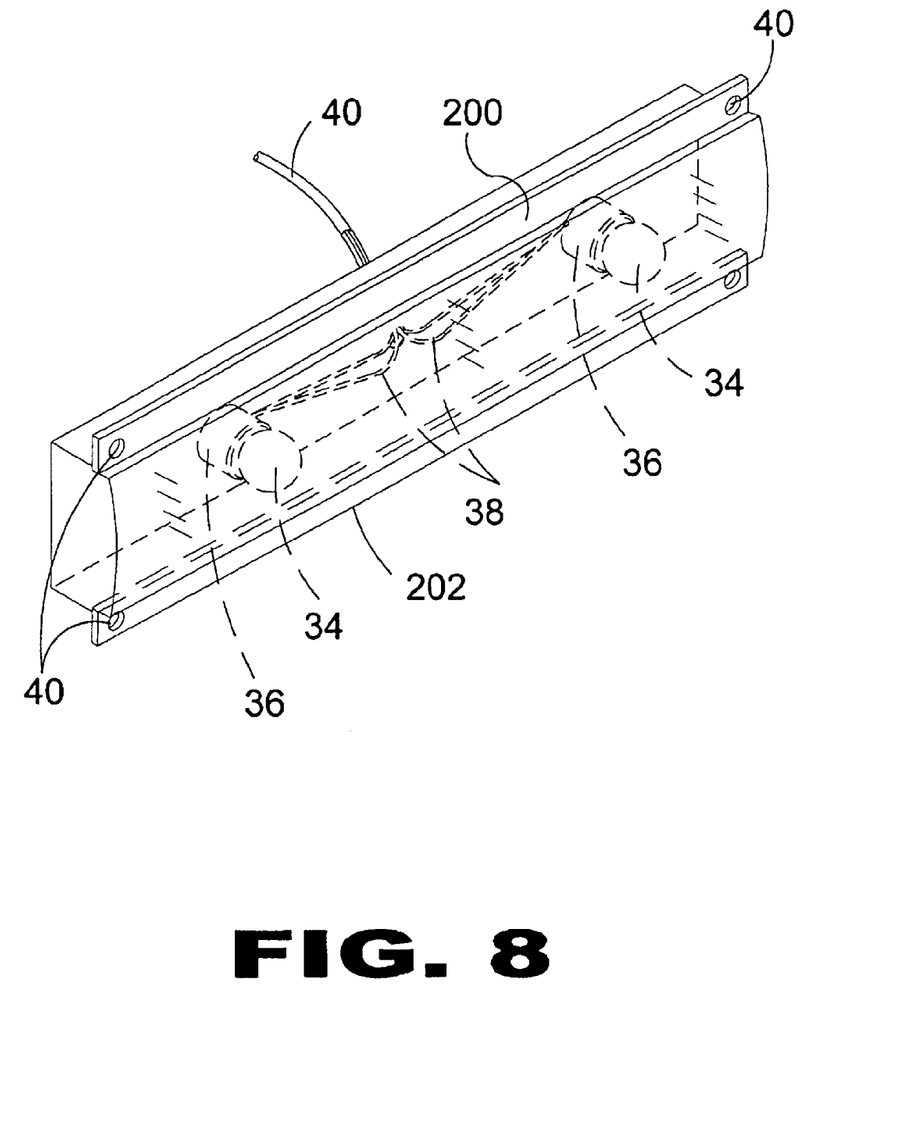
FIG. 8 is a perspective view of an alternate embodiment of the present invention. The front brake light indicator of the present invention includes one or more bulbs within an enclosure and viewable from the front of the vehicle.

Depicted in FIGS. 3–5, the primary light 30 is elongated and runs continuously along the vehicle bumper 26, wrapping at least partially around the vehicle first side 24 and vehicle second side 25. The primary light 30 has an enclosure 32 that is inserted through the bumper 26 from behind and held in place by clips 42 and fasteners 44 that are attached to the bumper 26.

Additionally, in this embodiment upper lights 50 could also be included and extend around to the vehicle sides 24,25, such that the upper lights 50 are also visible from both the front and sides of the vehicle 22. In this embodiment the primary light 30 will have a plurality of bulbs 34. When so arranged the primary light 30 and upper lights 50 form a unique frontal and side view that will be quickly recognizable by oncoming traffic and pedestrians.

Figure 9:
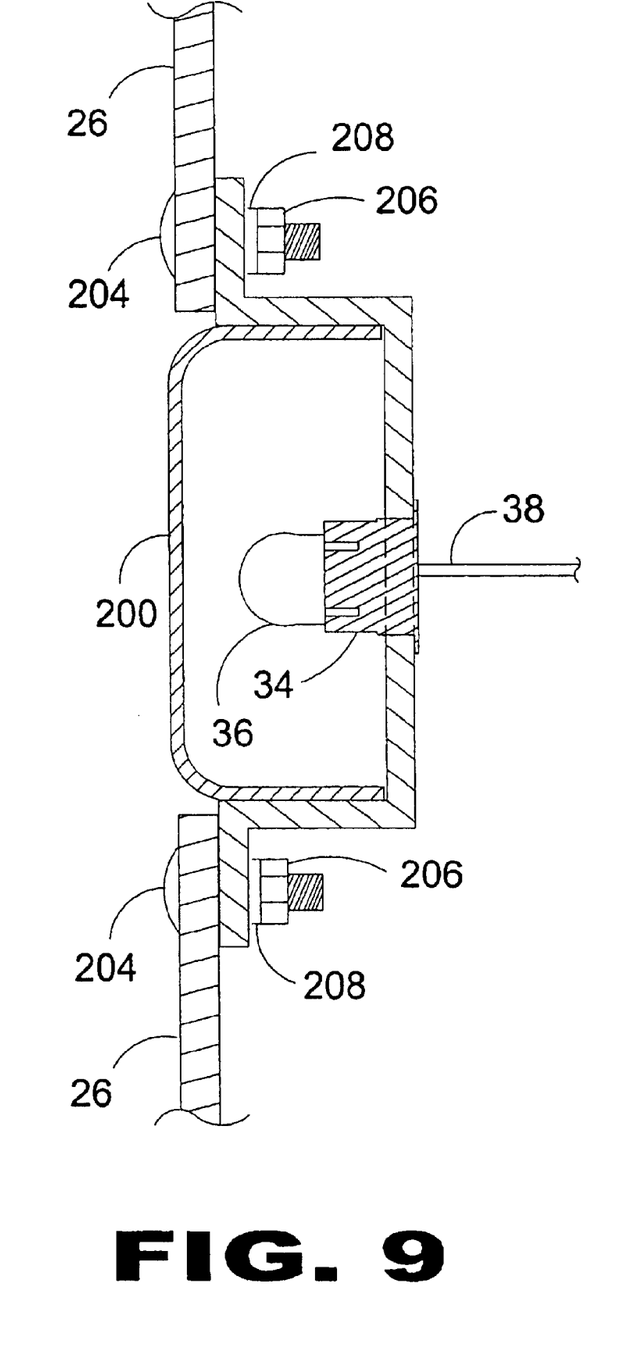
FIG. 9 is a sectional side view of an alternate embodiment of the present invention.

FIGS. 6–9 depict an alternate light 200 that includes an enclosure 202 and light sources in the form of light bulbs 34 mounted in light sockets 36 in the enclosure 202, with wiring 38 that connects the alternate light 200 to the vehicle brake wiring such that the light bulbs 34 shine when the vehicle brake is depressed. Mounting holes 40 are provided for attachment to the vehicle front bumper 26. Fasteners such as bolts 204, nuts 206 and washers 208 can be used, although other fasteners are contemplated, including rivets, adhesives, and the like. A hole 48 is positioned in the vehicle bumper 26 to allow the rear insertion of the brake light enclosure 202 through the hole 48, as shown in FIG. 9.

A first and second upper light 50 each have a bulb and connective electrical wiring housed in an upper light enclosure. The upper lights 50 are positioned adjacent or in the proximity of the vehicle turn signals 28 or headlights 27. When so positioned the supplemental brake light assembly 20 presents a triangular appearance when viewed from the front of the vehicle 22. The triangle is inverted and is vertically opposite from the triangle presented by the conventional rear brake lights and high, center-mounted brake light. The oncoming vehicle's driver will instantly distinguish the front brake light triangle from the oppositely oriented rear brake light triangle.

Figure 10:
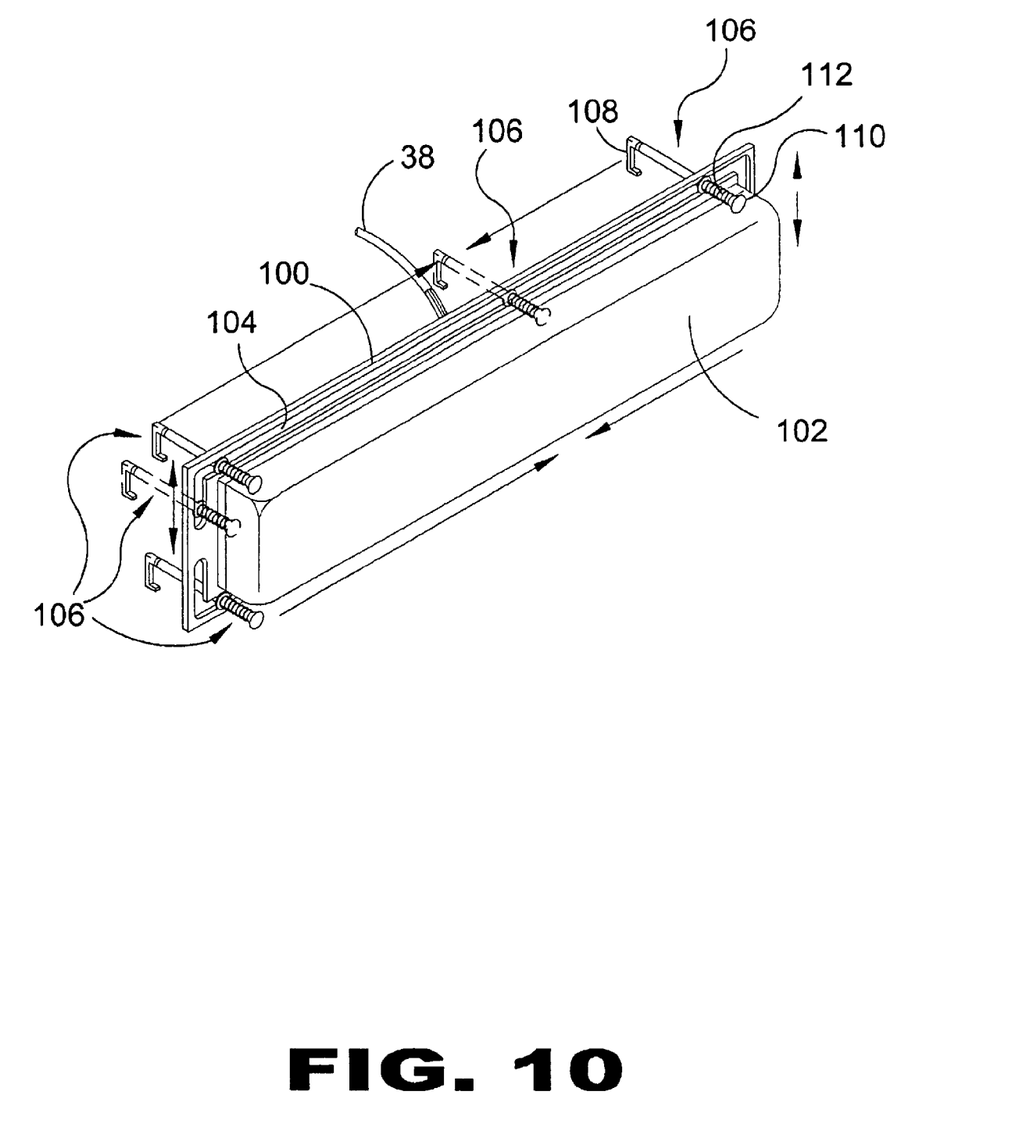
FIG. 10 is an alternate device of the present invention. This embodiment can be placed, by the user, to a suitable position on a vehicle's bumper and grill units. This embodiment supplies spring operated hooks that consist of a swivel hook head that can be inserted within the vehicle's front bumper and grill portion and adjusted to fasten from within.
Figure 11:
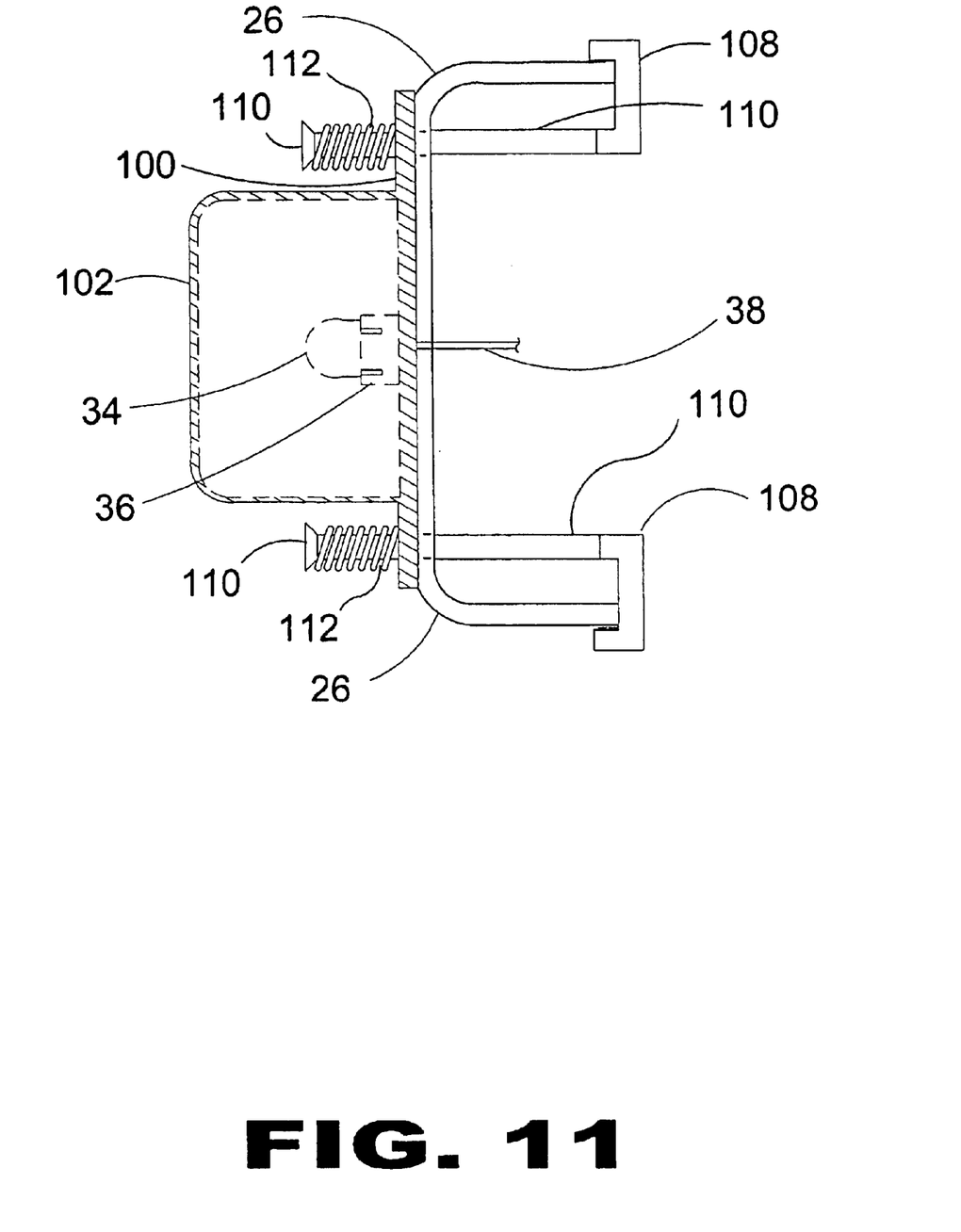
FIG. 11 is a sectional view of the alternate embodiment shown in FIG. 10.

FIGS. 10–11 depict another embodiment of the primary light 100, having an enclosure 102, slots 104 and special mounting fasteners 106 that have a hook 108 and a bolt portion 110 and a spring 112. This allows the primary light 100 to be attached on the exterior surface of the bumper 26. Rather than bolts through holes in the bumper, the fasteners 106 extend through the primary hole in the bumper 26 with the hooks 108 being rotated to hook the back edges of the bumper 26. The springs 112 bear upon the primary light 100 and push the bolt portion 110 away from the bumper 26, thus tightening the hook 108 against the bumper structure.

Figure 12:
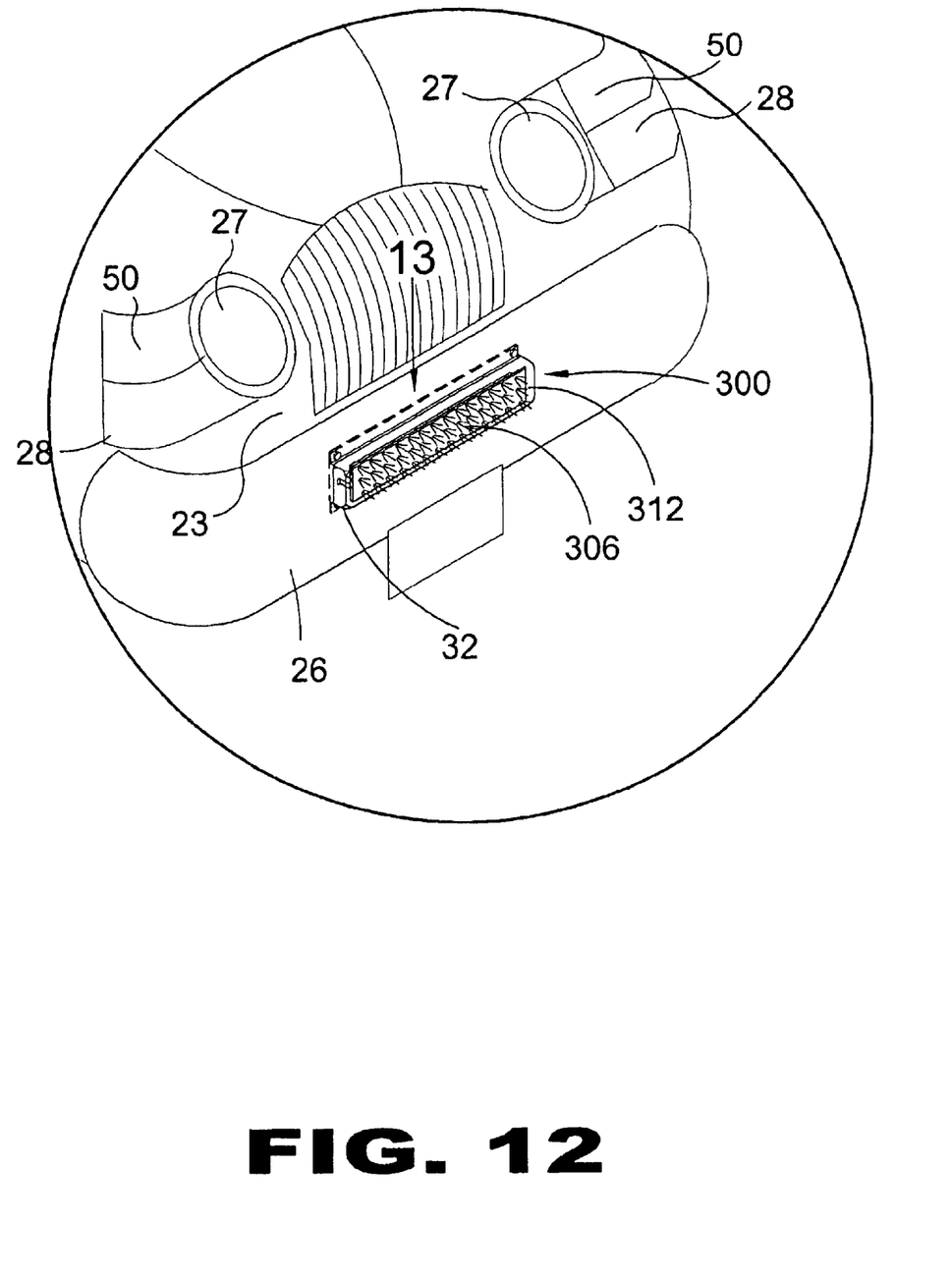
FIG. 12 is a perspective view of an embodiment of the present invention using optical fibers.
Figure 13:
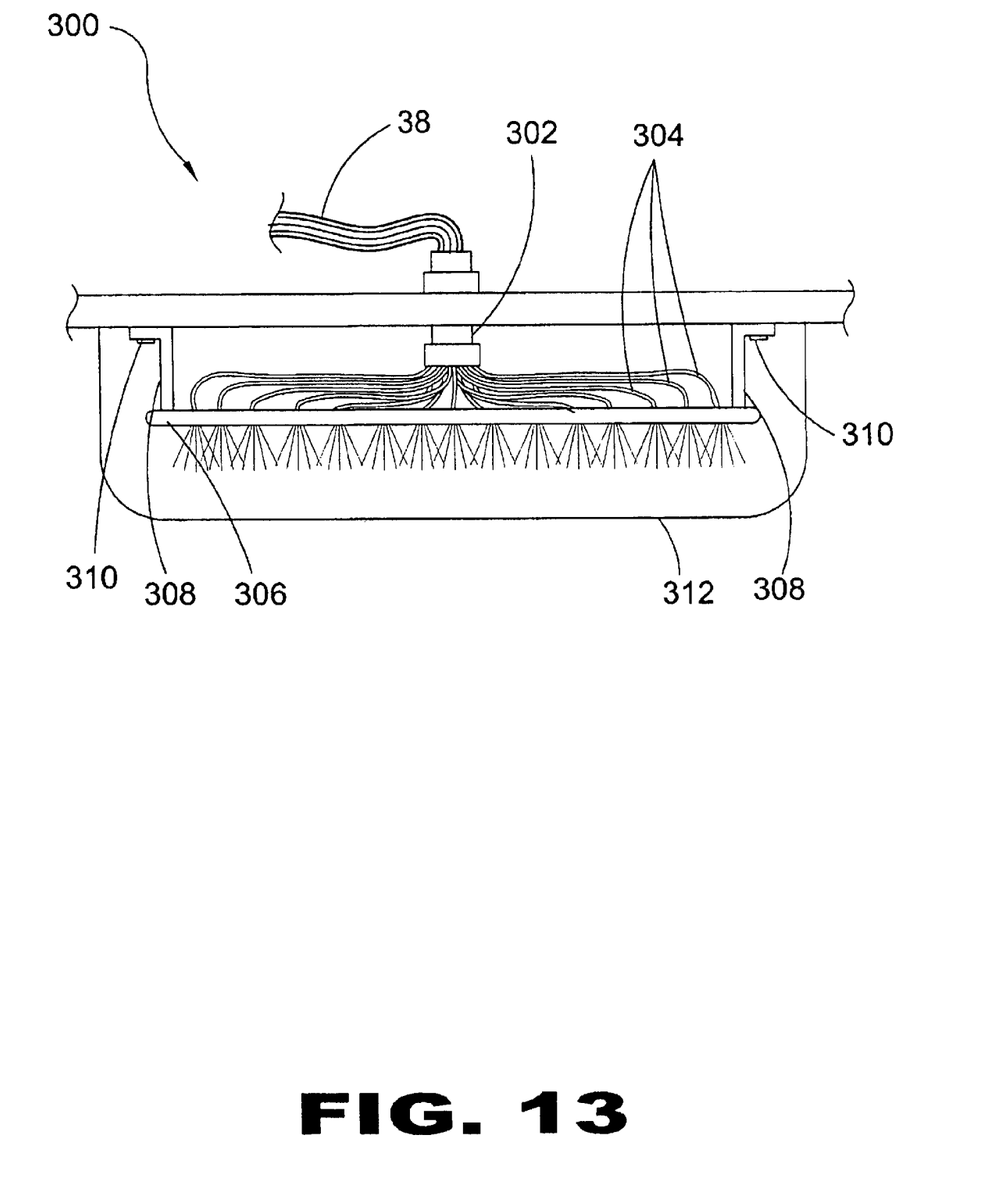
FIG. 13 is a top view of an embodiment of the present invention using optical fibers.

In another embodiment, shown in FIGS. 12–13, the primary light 300 has a light source 302 directing light into optical fibers 304 that in turn direct light through holes in a display member 306 mounted within the enclosure 32 using mounting brackets 308 and conventional fasteners 310. The optical fibers 304 and the display 306 present a unique frontal appearance that will readily inform the oncoming driver that front brake lights are being viewed and not rear brake lights.

With respect to the above description then, it is to be realized that the optimum material and dimensional relationships for the parts of the supplemental brake light assembly 20, will include variations in size, materials, shape, and form, which will occur to those skilled in the art upon review of the present disclosure. For example, various positions with respect to the turn signals 28 can be chosen for the upper lights 50, and the turn signals 28 can be used as the upper lights with modifications to the vehicle 22 wiring. Various means and locations for the attachment of the primary light 30,100,200,300 and the upper lights 50 can be utilized, including attachment of the primary light 30,100,200,300 on the vehicle front structure 23, but not on the front bumper 23. Various types of bulbs, including halogen and filament bulbs can be used. All equivalent relationships to those illustrated in the drawings and described in the specification are intended to be encompassed by the present invention.

What is claimed is:

1. In combination with a brake lighting system for a vehicle, the vehicle having a front and rear structure, a front bumper in the front structure, a brake and an electric brake light system having at least one brake light positioned on the vehicle rear structure and electrical wiring, the rear brake light system being electrically wired to respond to the application of the brake by causing the at least one brake light to shine, a supplemental electric brake light assembly, comprising:

a first, second and third electric light source;

a first enclosure for enclosing the first light source, a second enclosure for enclosing the second light source, and a third enclosure for enclosing the third light source, the first, second and third enclosures being positioned on the vehicle front structure;

said first and second enclosures being located above and spaced from said front bumper and from each other, and said third enclosure located on said front bumper so that a triangle is formed when viewed from the front of the vehicle;

supplemental electrical wiring for including the supplemental brake light assembly in the vehicle electric brake light system such that the first, second and third supplemental electric brake light light sources shine in response to application of the vehicle brake; and said vehicle having two headlight assemblies each assembly having an inner edge, and the third enclosure has a left end and right end, the third enclosure being positioned such that the left end and right end are between vertical lines extending downwardly from the headlight assemblies inner edges.

* * * * *